United States Patent
Li

(10) Patent No.: US 9,811,826 B2
(45) Date of Patent: Nov. 7, 2017

(54) METHOD AND APPARATUS FOR INCREASING SECURITY OF AN ELECTRONIC PAYMENT

(71) Applicant: TENCENT TECHNOLOGY (SHENZHEN) COMPANY LIMITED, Shenzhen (CN)

(72) Inventor: Wei Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 485 days.

(21) Appl. No.: 14/528,162

(22) Filed: Oct. 30, 2014

(65) Prior Publication Data

US 2015/0058205 A1    Feb. 26, 2015

Related U.S. Application Data

(63) Continuation of application No. PCT/CN2014/076793, filed on May 5, 2014.

(30) Foreign Application Priority Data

Jul. 11, 2013  (CN) .......................... 2013 1 0292134

(51) Int. Cl.
  *G06F 21/00* (2013.01)
  *G06Q 20/38* (2012.01)
  *H04L 29/06* (2006.01)

(52) U.S. Cl.
  CPC ........... *G06Q 20/382* (2013.01); *H04L 63/04* (2013.01)

(58) Field of Classification Search
  CPC .............................. G06Q 20/382; H04L 63/04
  See application file for complete search history.

(56) References Cited

U.S. PATENT DOCUMENTS 7,950,020 B2    5/2011  Sun et al.
8,229,849 B2 *  7/2012  Olliphant ............... G06Q 20/10
                                                    705/1.1
(Continued)

FOREIGN PATENT DOCUMENTS

CN    101692277 A        4/2010
CN    102088679 A *      6/2011    ......... H04L 63/0236
(Continued)

OTHER PUBLICATIONS

Taiwan Intellectual Property Office (TIPO) Office Action 1 for 103123029 dated Sep. 7, 2015 pp. 1-7.
(Continued)

*Primary Examiner* — Mahfuzur Rahman
(74) *Attorney, Agent, or Firm* — Anova Law Group, PLLC

(57) ABSTRACT

Methods and apparatus for increasing security of an electronic payment are provided. By monitoring that an application program used for the electronic payment starts running in a terminal apparatus, whether another currently-running program in the terminal apparatus has a keyword existed in a pre-set security-threat program listing is checked. The another currently-running program having the keyword existed in the pre-set security-threat program listing is then terminated. An exemplary apparatus can include a monitoring module, a keyword checking module, and/or a first processing module.

18 Claims, 6 Drawing Sheets

(56) References Cited

U.S. PATENT DOCUMENTS

| | | | | |
|---|---|---|---|---|
| 8,433,653 | B2* | 4/2013 | Olliphant | G06Q 20/10 |
| | | | | 705/39 |
| 8,639,916 | B2* | 1/2014 | Mersh | G06F 21/79 |
| | | | | 713/2 |
| 2004/0117315 | A1* | 6/2004 | Cornuejols | G06Q 20/382 |
| | | | | 705/64 |
| 2009/0068982 | A1 | 3/2009 | Chen et al. | |
| 2010/0292556 | A1 | 11/2010 | Golden | |
| 2013/0054473 | A1 | 2/2013 | Jan et al. | |
| 2014/0026228 | A1* | 1/2014 | Isozaki | G06F 21/50 |
| | | | | 726/27 |

FOREIGN PATENT DOCUMENTS

| | | | | |
|---|---|---|---|---|
| CN | WO 2011069438 A1 * | 6/2011 | | H04L 63/0236 |
| CN | 102365650 A | 2/2012 | | |
| CN | 101727705 B | 6/2012 | | |
| CN | 102542688 A | 7/2012 | | |
| CN | 103152740 A | 6/2013 | | |
| WO | 2006000021 A1 | 1/2006 | | |
| WO | 2010088727 A1 | 8/2010 | | |

OTHER PUBLICATIONS

Taiwan Intellectual Property Office (TIPO) Office Action 2 for 103123029 dated Feb. 25, 2016 pp. 1-6.

The State Intellectual Property Office of the People's Republic of China (SIPO) Office Action 1 for 201310292134.0 dated Oct. 10, 2015 pp. 1-8.

The State Intellectual Property Office of the People's Republic of China (SIPO) Office Action 2 for 201310292134.0 dated Mar. 3, 2016 pp. 1-6.

The World Intellectual Property Organization (WIPO) International Search Report for PCT/CN2014/076793 dated Aug. 4, 2014 pp. 1-3.

* cited by examiner

METHOD AND APPARATUS FOR INCREASING SECURITY OF AN ELECTRONIC PAYMENT

CROSS-REFERENCES TO RELATED APPLICATIONS

This application is a continuation application of PCT Patent Application No. PCT/CN2014/076793, filed on May 5, 2014, which claims priority to Chinese Patent Application No. 201310292134.0, filed on Jul. 11, 2013, the entire content of which is incorporated herein by reference.

FIELD OF THE DISCLOSURE

The present disclosure relates to the field of terminal apparatus security technology and, more particularly, relates to methods and apparatus for increasing security of an electronic payment.

BACKGROUND

Electronic payment includes a currency payment or cash flowing through a network by users (including customers, manufacturers, and financial institutions) to use secure electronic means for payment. With the popularization of smart phones, tablet computers, and other mobile terminals, the electronic payment is practically accepted by more people with mobile terminals.

Currently, the security technology of electronic payment includes encrypting communication data, or performing an authentication process to payment software using certificates or other means, or encrypting local data to protect the security of electronic transactions. However, these methods are all set based on transaction data or transaction software itself, which neglects the security of the operating environment of the electronic payment software.

A safe operating environment can provide basic security of the electronic payment. If the operating environment has a security risk, regardless of the safety of the electronic payment software itself, the security of the electronic payment cannot be effectively provided. For example, if screen capture software exists in the operating environment, Trojan programs may fully intercept the inputted image and send to a third person when the user inputs information of payment account. The user payment account information is then unauthorizedly disclosed. In another example, some malicious programs can monitor operations on the user's keyboard. These malicious programs can record the information from the keyboard and then send to the server. Consequently, the security information including user password, verification code, and other information inputted from the keyboard is unauthorizedly disclosed.

Therefore, it is desirable to provide a secure operating environment for electronic payments to effectively increase security of the electronic payments.

BRIEF SUMMARY OF THE DISCLOSURE

One aspect or embodiment of the present disclosure includes a method for increasing security of an electronic payment implemented by a terminal apparatus. It is monitored whether an application program used for the electronic payment starts running in the terminal apparatus. The terminal apparatus includes one or more processors. When the application program used for the electronic payment is monitored starting running, it is checked whether another currently-running program in the terminal apparatus has a keyword existed in a pre-set security-threat program listing. The another currently-running program having the keyword existed in the pre-set security-threat program listing is terminated.

To check whether the another currently-running program in the terminal apparatus has the keyword existed in the pre-set security-threat program listing, the another currently-running program in the terminal apparatus is regularly checked during a running period of the application program used for the electronic payment. The keyword of the another currently-running program is extracted and compared with the pre-set security-threat program listing.

After terminating the another currently-running program having the keyword existed in the pre-set security-threat program listing, the another currently-running program having the keyword existed in the pre-set security-threat program listing is updated.

After terminating the another currently-running program having the keyword existed in the pre-set security-threat program listing, a prompt message is displayed to a user to prompt the user to select whether to unload the another currently-running program from the terminal apparatus. In response to an unloading selection operation of the user, the another currently-running program is unloaded.

The method for increasing security of the electronic payment further includes regularly obtaining updating information of the pre-set security-threat program listing from a server, according to a pre-set updating regulation; and updating the pre-set security-threat program listing, according to the updating information.

The pre-set updating regulation includes an updating cycle such that the terminal apparatus sends a request for the updating information to obtain the pre-set security-threat program listing by an interval of a pre-set duration to the server; and according to response information returned from the server, the terminal apparatus downloads the updating information of the pre-set security-threat program listing.

The pre-set updating regulation includes an updating cycle such that the terminal apparatus sends a request for the updating information to obtain the pre-set security-threat program listing to the server, when a network interface is monitored open; and according to response information returned from the server, the terminal apparatus downloads the updating information of the pre-set security-threat program listing.

The pre-set security-threat program listing includes a system process, a third party processes, a plug-in, or a combination thereof. The pre-set security-threat program listing, when running, causes a security threat to the electronic payment. The plug-in includes a screen capture plug-in, a recording plug-in, or a combination thereof.

The another currently-running program includes a system process, a third party process, an application program plug-in, or a combination thereof. The application program plug-in includes a screen capture plug-in, an inputting method plug-in, or a combination thereof.

The keyword existed in the pre-set security-threat program listing includes at least a part of a name of a program in the pre-set security-threat program listing. The name of the program includes a name in one or more languages. The name of the program includes a Chinese name, an English name, or a combination thereof. The keyword includes "Pinyin input method", or "input method".

A non-transitory computer-readable storage medium is provided having instructions stored thereon. When being executed, the instructions cause the one or more processors of the terminal apparatus to perform the disclosed method.

Another aspect or embodiment of the present disclosure includes an apparatus for increasing security of an electronic payment. The apparatus includes one or more processors, and a non-transitory computer-readable storage medium having instructions stored thereon. The instructions are executed by the one or more processors and include a monitoring module, a keyword checking module, and a first processing module.

The monitoring module is configured to monitor whether an application program used for the electronic payment starts running. The keyword checking module is configured to check whether another currently-running program in the terminal apparatus has a keyword existed in a pre-set security-threat program listing, when the application program used for the electronic payment is monitored starting running. The first processing module is configured to terminate the another currently-running program having the keyword existed in the security-threat program listing.

The keyword checking module includes a program checking unit, a keyword extracting unit, and a keyword comparing unit. The program checking unit is configured to regularly check the another currently-running program in the terminal apparatus, during a running period of the application program used for the electronic payment. The keyword extracting unit is configured to extract the keyword of the another currently-running program. The keyword comparing unit is configured to compare the extracted keyword with the pre-set security-threat program listing.

The apparatus further includes a second processing module configured to unload the another currently-running program having the keyword existed in the security-threat program listing.

The apparatus further includes a third processing module configured to display a prompt message to prompt the user to select whether to unload the another currently-running program, and to respond to an unloading selection operation of the user to unload the another currently-running program.

The apparatus further includes an updating-information obtaining module and a security-threat-program-listing updating module. The updating-information obtaining module is configured to regularly obtain updating information of the security-threat program listing from a server, according to a pre-set updating regulation. The security-threat-program-listing updating module is configured to update the security-threat program listing, according to the updating information obtained by the updating-information obtaining module.

The apparatus further includes a request sending module and an updating-information downloading module. The pre-set updating regulation includes an updating cycle such that the request sending module is configured to send a request for the updating information to obtain the pre-set security-threat program listing by an interval of a pre-set duration to the server; and according to response information returned from the server, the updating-information downloading module is configured to download the updating information of the pre-set security-threat program listing.

The apparatus further includes a request sending module and an updating-information downloading module. The pre-set updating regulation includes an updating cycle such that the request sending module is configured to send a request for the updating information to obtain the pre-set security-threat program listing to the server, when a network interface is monitored open; and according to response information returned from the server, the updating-information downloading module is configured to download the updating information of the pre-set security-threat program listing.

The pre-set security-threat program listing includes a system process, a third party processes, a plug-in, or a combination thereof. The pre-set security-threat program listing, when running, causes a security threat to the electronic payment. The plug-in includes a screen capture plug-in, a recording plug-in, or a combination thereof.

The another currently-running program includes a system process, a third party process, an application program plug-in, or a combination thereof. The application program plug-in includes a screen capture plug-in, an inputting method plug-in, or a combination thereof.

The keyword existed in the pre-set security-threat program listing includes at least a part of a name of a program in the pre-set security-threat program listing. The name of the program includes a name in one or more languages. The name of the program includes a Chinese name, an English name, or a combination thereof. The keyword includes "Pinyin input method", or "input method".

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-7 depict exemplary methods and apparatus for increasing security of an electronic payment in accordance with various disclosed embodiments. The exemplary methods and apparatus can be implemented, for example, in an exemplary environment 800 as shown in FIG. 8.

Figure 8:
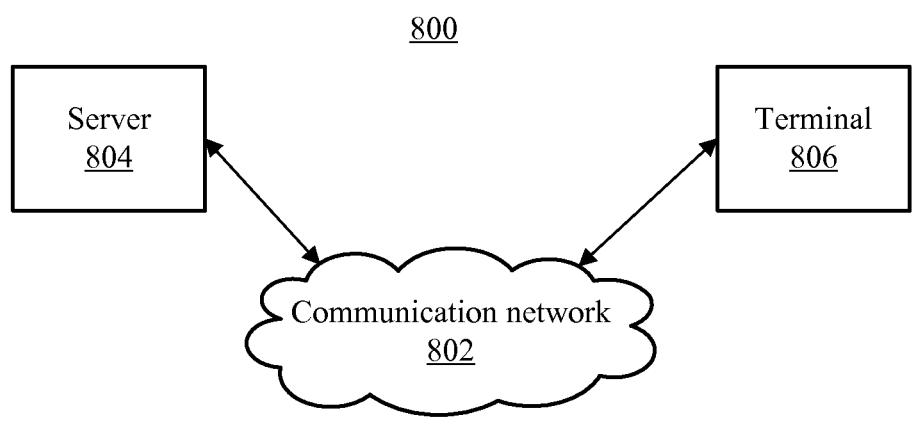
FIG. 8 depicts an exemplary environment incorporating certain disclosed embodiments.

As shown in FIG. 8, the environment 800 can include a server 804, a terminal 806, and a communication network 802. The server 804 and the terminal 806 may be coupled through the communication network 802 for information exchange, for example, Internet searching, webpage browsing, etc. Although only one terminal 806 and one server 804 are shown in the environment 800, any number of terminals 806 or servers 804 may be included, and other devices may also be included.

The communication network 802 may include any appropriate type of communication network for providing network connections to the server 804 and terminal 806 or among multiple servers 804 or terminals 806. For example, the communication network 802 may include the Internet or other types of computer networks or telecommunication networks, either wired or wireless.

A terminal, as used herein, may refer to any appropriate user terminal apparatus with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terms "terminal" and "terminal apparatus" can be used interchangeably.

A server, as used herein, may refer one or more server computers configured to provide certain server functionalities, for example, search engines and database management. A server may also include one or more processors to execute computer programs in parallel. The server 804 and the terminal 806 may be implemented on any appropriate computing platform.

In various embodiments, a method for increasing security of electronic payments can be implemented on smart phones, handheld computers, tablet computers, and any suitable mobile terminals to increase security for the electronic payments. Of course, the disclosed method for increasing security of electronic payments can also be used on desktop computers, laptops, and other non-mobile terminals.

Figure 1:
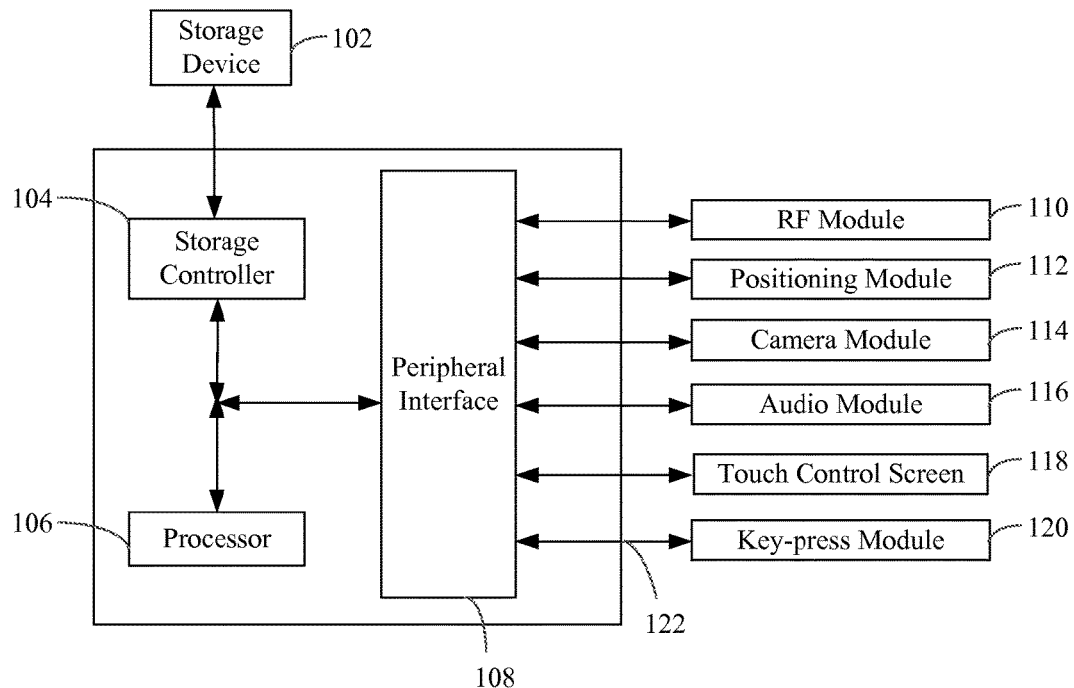
FIG. 1 depicts an exemplary terminal apparatus consistent with various disclosed embodiments.

FIG. 1 depicts an exemplary terminal apparatus. The exemplary terminal apparatus 100 includes a storage device 102, a storage controller 104, one or more processors 106 (although only one processor 106 is illustrated in FIG. 1 as an example), a peripheral interface 108, an RF (radio frequency) module 110, a positioning module 112, a camera module 114, an audio module 116, a touch control screen 118, and/or a key-press module 120. These components can communicate with one another via one or more communication buses/signal lines 122.

Note that the structure illustrated in FIG. 1 is for illustration purposes, while the terminal apparatus 100 can further include more or less components as illustrated in FIG. 1 and/or different configurations can be further included. Each component illustrated in FIG. 1 can be implemented by hardware, software, or a combination thereof.

The storage device 102 is configured to store software (or software programs) and modules including, for example, program instructions/modules corresponding to the methods and apparatus for increasing security of electronic payments in the terminal apparatus. By running the software programs and modules stored in the storage device 102, the processor(s) 106 can execute a variety of functional applications and data processes to realize the methods of increasing security for electronic payments.

The storage device 102 includes a high-speed RAM (i.e., random access memory), an NVM (nonvolatile memory) including, e.g., one or more magnetic memory devices, flash memory devices, or other nonvolatile solid-storage devices. In various embodiments, the storage device 102 further includes a remotely-configured storage device with respect to the processor(s) 106. The remotely-configured storage device can communicate with the terminal apparatus 100 via a network. The network includes, but is not limited to, an internet, an intranet, an LAN, a mobile communication network and/or combinations thereof. When the processor(s) 106 and/or other possible components in FIG. 1 access the storage device 102, the access can be performed under the control of the storage controller 104.

The peripheral interface 108 is configured to couple the inputting/outputting devices to the CPU and the storage device 102. The processor(s) 106 can run a variety of software programs and instructions that are stored in the storage device 102 in order to execute a variety of functions of the terminal apparatus 100 and to perform data processes.

In some embodiments, the peripheral interface 108, the processor(s) 106 and/or the storage controller 104 can be realized or configured in one single chip. In other embodiments, the peripheral interface 108, the processor(s) 106 and/or the storage controller 104 can be realized or configured standalone in separate chips.

The RF module 110 is configured to receive and send electromagnetic waves, to interconvert the electromagnetic waves with electrical signals, and to communicate with a communication network or other devices. The RF Module 110 further includes all possible circuit elements used for executing these functions. Such circuit elements can include: e.g., antenna, RF transceiver, digital signal processor, encrypting/encoding chip, user SIM (subscriber identity module) card, storage device etc. The RF module 110 can communicate with all kinds of networks, such as the internet, intranet, wireless network; or communicate with other devices via a wireless network. The wireless network can include cellular telephone network, wireless local area network, or LAN. The wireless network can use a variety of communications standards, protocols, and technologies including, but not limited to, the GSM (Global System for Mobile Communications), EDGE (Enhanced Data GSM Environment), W-CDMA (wideband Code division multiple Access), CDMA (Code division access), TDMA (Time division multiple Access), Bluetooth, WiFi (e.g., the United States Institute of Electrical and Electronic Engineers standard IEEE 802.11A, IEEE 802.11B, IEEE 802.11G, and/or IEEE 802.11N), VoIP (Voice over Internet protocol), Wi-Max (Worldwide Interoperability for Microwave Access), other protocols used for email, instant messaging and text messages, and/or any other suitable communication protocols, and even including the protocols which currently have not been developed but will be developed.

The positioning module 112 is configured to obtain current location of the terminal apparatus 100. The positioning module 112 can include, but be not limited to, a GPS (global satellite positioning system), and/or a positioning technology based on a wireless LAN or mobile communication network.

The camera module 114 is configured to take images and/or videos. Such images and/or videos can be stored in the storage device 102, and can be sent by the RF module 110.

The audio module 116 is configured to provide an audio interface for users. The audio module 116 can include one or more microphones, one or more speakers and audio circuits. The audio circuits can receive voice data from the peripheral interface 108, convert the voice data to electrical signals, and send the electrical signals to the speaker. The speaker can convert the electrical signals to sound waves which can be heard by ears. The audio circuits can receive the electrical signals from the microphone, the signals can be converted to sound data, and sound data can be transferred to peripheral interface 108 for further processing. The audio data can be obtained by the storage device 102 or via the RF module 110. In addition, the audio data can further be stored in the storage device 102 or be sent by the RF module 110. In various embodiments, the audio module 116 can be further configured to provide an audio interface to a headset or other devices including a headset jack.

The touch control screen 118 is configured to provide an outputting and inputting interface to the terminal apparatus 100, meanwhile to users. For example, the touch control screen 118 can display the video output to a user. The content of the video output includes text, graphics, video, and combinations thereof. In some cases, outputted results may correspond to certain user interface. The touch control screen 118 can also configured to receive input from the user, e.g., by clicking, sliding, or other gesture based operation, such that the objected user interface can respond to the input form the user. The technology of detecting inputs from a user can include any possible touch control detection technology based on resistive, capacitive or any suitable technology. The touch control screen 118 can include, but be not limited to, a flat panel display, and/or a light emitting polymer display.

Likewise, the key-press module 120 provides a user with an interface for the user to input in the terminal apparatus 100. The user can press different buttons to allow the terminal apparatus 100 to perform different functions.

Figure 2:
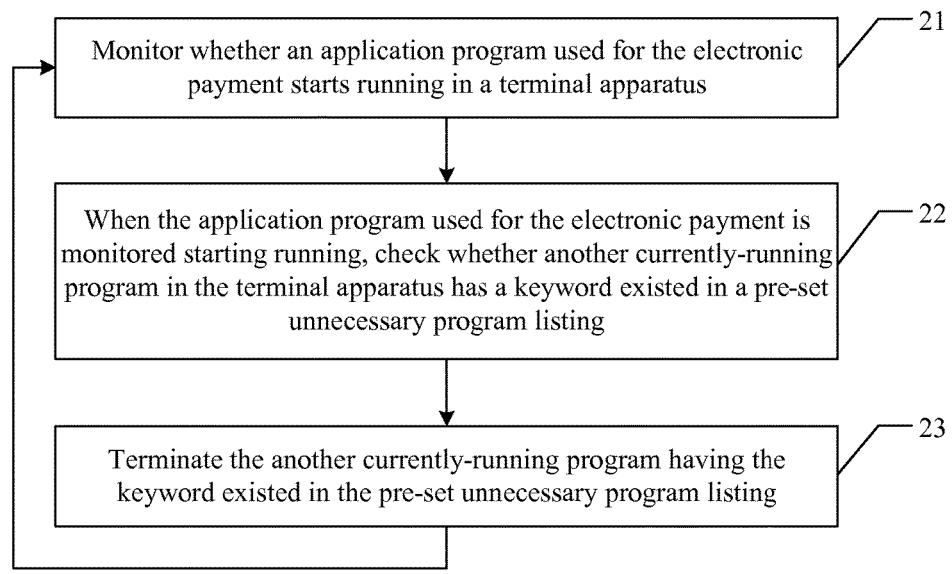
FIG. 2 depicts an exemplary method for increasing security of an electronic payment in a terminal apparatus consistent with various disclosed embodiments.

FIG. 2 depicts an exemplary method for increasing security of an electronic payment in a terminal apparatus consistent with various disclosed embodiments.

In Step 21, it is monitored whether an application program used for an electronic payment starts running in a terminal apparatus. The application program used for the electronic payment includes, for example, transaction client programs (e.g., alipay) secured by the third party, client programs of official website of banks, and/or securities trading programs. In various embodiments, the client programs can include any suitable software programs installed on a terminal apparatus.

In Step 22, when the application program used for the electronic payment is monitored starting running, whether another currently-running program in the terminal apparatus has a keyword existed in a pre-set security-threat program listing is checked. The another currently-running program includes, a system process, a third party process, application program plug-ins (e.g., inputting method plug-ins, screen capture plug-ins), etc.

The keyword existed in the pre-set security-threat program listing can be at least a part (e.g., a whole) of a name of a program or a process in the pre-set security-threat program listing. The name of the program may be a name in one or more suitable languages. For example, the name of the program may include a Chinese name, an English name, and/or any other names in a suitable language. The keyword can include, e.g., "Sogou Pinyin input method, or the "input method" or "QQ", etc. The keyword of another currently-running program in the terminal apparatus can be a part or a whole of a name of a program in the another currently-running program.

The pre-set security-threat program listing can include keywords of any unnecessary system processes, any third party processes, or any plug-ins (e.g., screen capture plug-ins, recording plug-ins, etc.), all of which may have possibility of causing the security threat to electronic payment when running. Although such programs corresponding to the keyword may not affect normal operation of the application program of the electronic payment, such programs, if left running, may have a security risk to the electronic payment. For example, when a user processes an electronic transaction, some third party process may use screen capture plug-ins to automatically screen-capture user account, password, and other input interface in the system background, and then send the screen captured image to an unauthorized third person/party, such that electronic transaction account and other confidential information of the user for the terminal apparatus are unauthorizedly disclosed. Because such third party process operates in the background, the user may not know about it when the electronic transaction information is unauthorizedly disclosed.

In Step 23, the another currently-running program having the keyword existed in the pre-set security-threat program listing is terminated.

In the disclosed method for increasing security of electronic payments, other currently-running program having the keyword existed in the pre-set security-threat program listing can be closed, when the application program for electronic payment is currently in operation. A security operating/running environment can therefore be provided for electronic payments. The security of electronic payments can be effectively improved.

Figure 3:
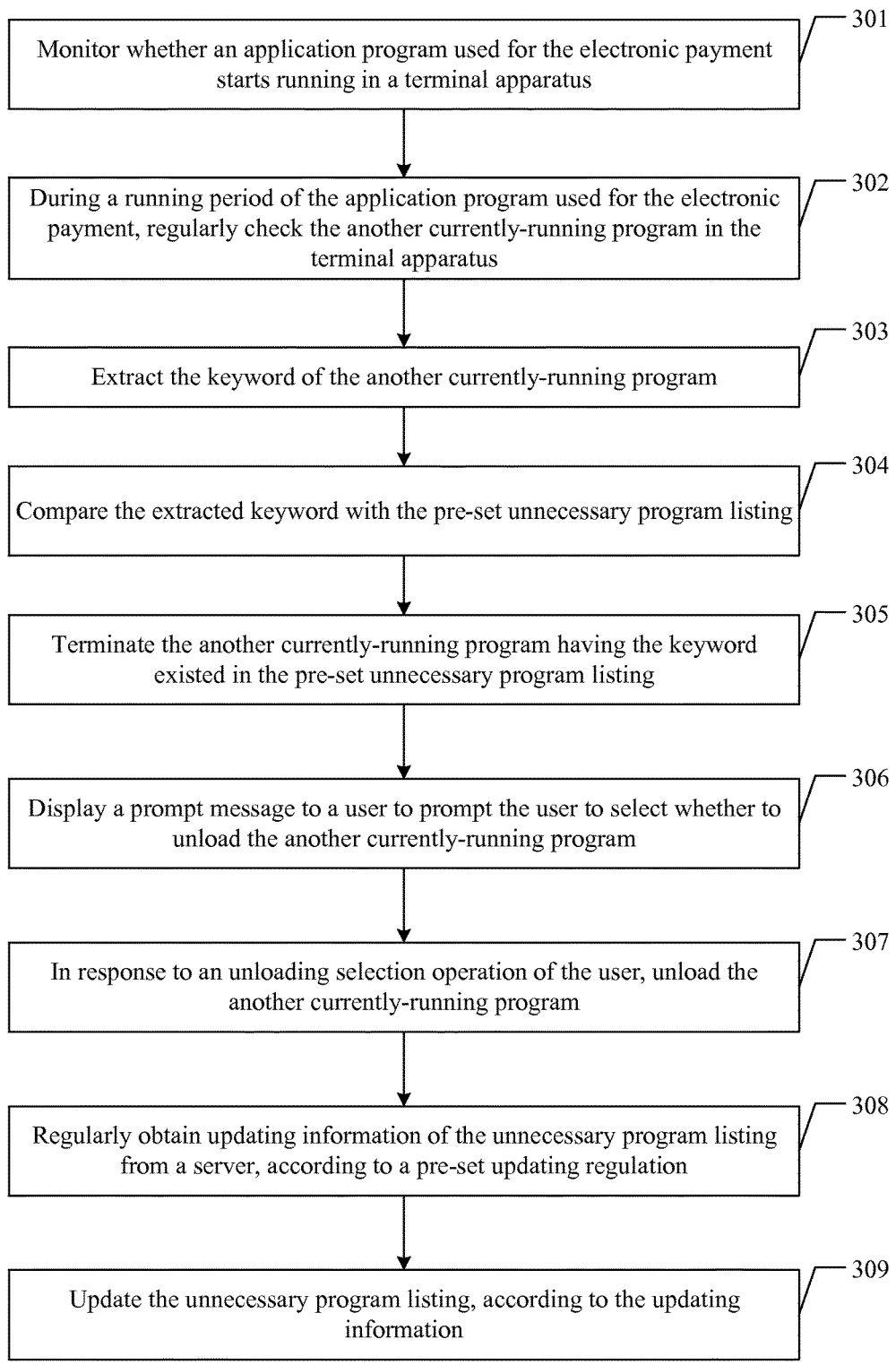
FIG. 3 depicts another exemplary method for increasing security of an electronic payment in a terminal apparatus consistent with various disclosed embodiments.

FIG. 3 depicts another exemplary method for increasing security of an electronic payment in a terminal apparatus consistent with various disclosed embodiments.

In Step 301, whether an application program used for an electronic payment starts running in a terminal apparatus is monitored.

In Step 302, during a running period of the application program used for the electronic payment, other currently-running programs in the terminal apparatus are regularly checked. For example, during the running period of the application program used for the electronic payment, a timer can be used to check other currently-running programs in the terminal apparatus in every pre-set time length (e.g., about 5 seconds).

In Step 303, the keyword of the another currently-running program is extracted.

In Step 304, the extracted keyword is compared with the pre-set security-threat program listing.

In Step 305, the another currently-running program having the keyword existed in the pre-set security-threat program listing is closed.

In a certain embodiment, a pre-configured black-and-white listing can be used to filter another (or any other) currently-running program(s) that needs to be closed. The white listing can be pre-configured to include a keyword list of the unnecessary system program that should be maintained. The black listing can be pre-configured to include the keyword list of the unnecessary system program that should be closed.

For example, the keyword extracted in Step 304 can be compared with the pre-configured black-and-white listing. According to pre-set rules, the terminal apparatus may either close the another currently-running program that does not have the keyword in the white listing, or close the another currently-running program having the keyword in the black listing, or display a prompt message to prompt the user whether to close the another currently-running program, when the keyword of the another currently-running program is not included in the black-and-white listing. And then based on the user operation, the terminal apparatus may select to close or not close the another currently-running program without the keyword. In this manner, via the black-and-white listing, the currently-running program can be flexibly selected whether to be closed.

In Step 306, a prompt message is displayed to a user to prompt the user to select whether to unload the another currently-running program.

In Step 307, in response to an unloading selection operation of the user, the another currently-running program is unloaded.

Note that, Steps in the disclosed methods can be added, modified, altered, and/or omitted. For example, Step 306 may be omitted. In accordance with the pre-set rules, in a case when the another currently-running program is marked as a high-risk program (e.g., a Trojan process) in the security-threat program listing, the terminal apparatus can unload the another currently-running program directly, and display the message of unloading results after unloading to prompt the user that the another currently-running program is a Trojan program, which has been automatically unloaded.

In a certain embodiment, after closing the another currently-running program having the keyword existed in the pre-set security-threat program listing, the terminal apparatus may also start another secure program having the same function with the closed another program to replace the closed another program. For example, when discovering that the running Thunis input plug-in is an insecure version hijacked by a third party Trojan program based on a comparison, the terminal apparatus can close the Thunis input plug-in, and meanwhile turn on Sogou input plug-in to ensure that the user can safely input information, such as passwords, via the Sogou input plug-in for processing the electronic payment.

In Step 308, according to a pre-set updating regulation, updating information of the security-threat program listing is regularly obtained from a server.

The pre-set updating regulation can include an updating cycle or an updating condition. Specifically, the terminal apparatus can send a request for the updating information to obtain the security-threat program listing at an interval of a pre-set duration (e.g., every 8 hours) to the server, then according to the response information returned from the server, downloads the updating information of the security-threat program listing. The terminal apparatus can send the request for the updating information of the security-threat program listing to the server, when the network interface (for example, WLAN, or 3G interface) is monitored open. Then, according to the response information returned from the server, the terminal apparatus can download the updating information of the security-threat program listing.

In Step 309, according to the updating information, the security-threat program listing is updated.

With the development of programming technology, everyday many new programs including Trojans programs are released. By regularly updating the security-threat program listing via a network, security-threats can be accurately filtered and closed timely to provide a secure operating environment for the electronic payments.

Figure 4A:
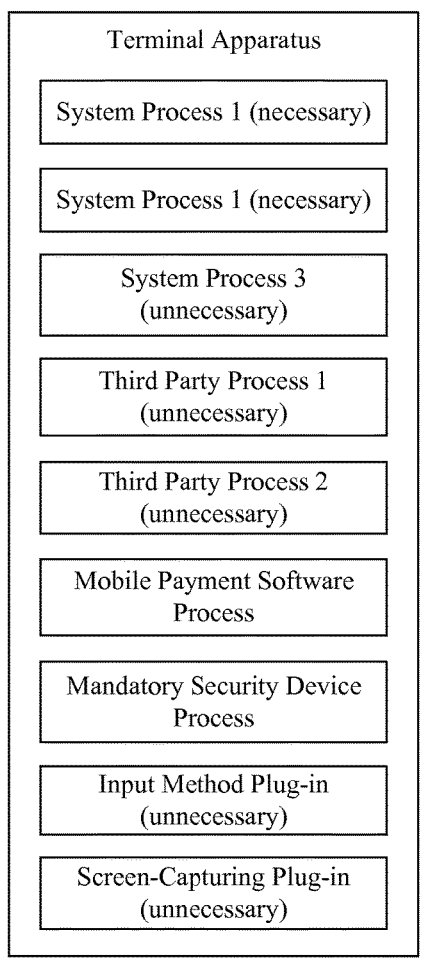
FIGS. 4A-4B depict an exemplary operating environment for performing a method of increasing security of an electronic payment in a terminal apparatus consistent with various disclosed embodiments.
Figure 4B:
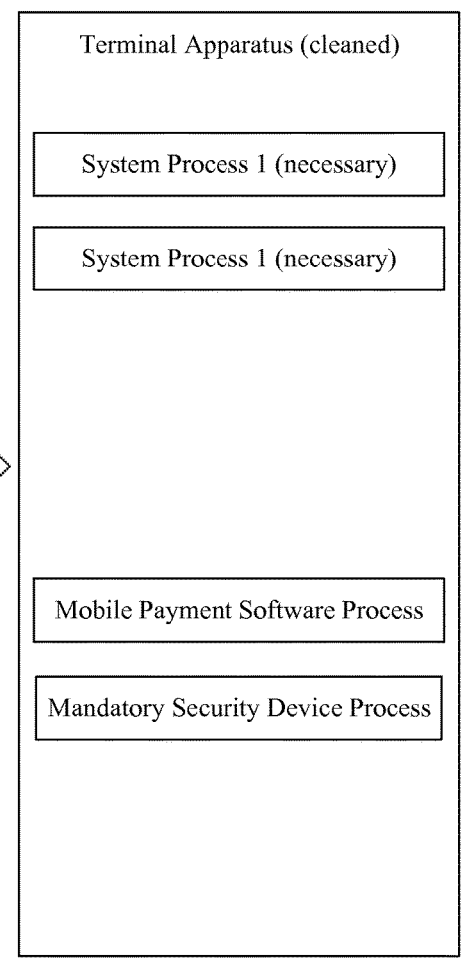

FIGS. 4A-4B depict an exemplary operating environment for performing a method of increasing security of an electronic payment in a terminal apparatus consistent with various disclosed embodiments.

Firstly, the terminal apparatus can use a built-in mandatory security device process to monitor that the mobile payment software process starts running, the currently-running programs in the terminal apparatus can be scanned. The scanning result is shown in FIG. 4A including a mandatory security device process, a mobile payment software process, a system process 1, a system process 2, a system process 3, a third party process 1, a third party process 2, an input method plug-in, and a screen capture plug-in, all of which are currently running.

Secondly, the terminal apparatus can then compare the extracted keyword with the pre-configured black-and-white listing to find that the system process 1 and 2 are necessary programs, while the system process 3, the third party process 1, the third party process 2, the input method plug-in, and screen capture plug-in are security-threats. As such, the terminal apparatus can close the system process 3, the third party process 1, the third party process 2, the input method plug-in, and screen-capture plug-in to clean the operating environment for the mobile payment software process, as shown in FIG. 4B.

In the disclosed method for increasing security of electronic payments, other currently-running program having the keyword existed in the pre-set security-threat program listing can be closed, when the application program for electronic payment is currently in operation. A security operating/running environment can therefore be provided for electronic payments. The security of electronic payments can be effectively improved.

Figure 5:
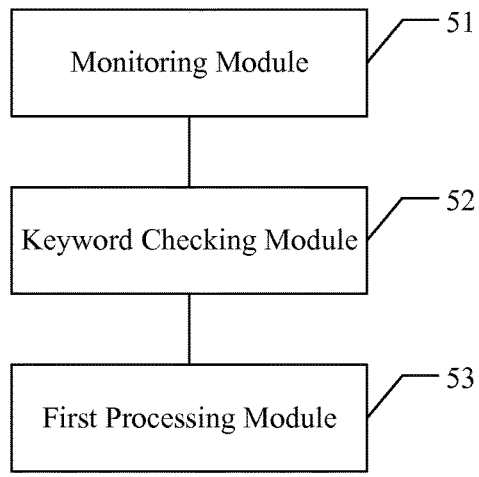
FIG. 5 depicts an exemplary apparatus for increasing security of an electronic payment in a terminal apparatus consistent with various disclosed embodiments.

FIG. 5 depicts an exemplary apparatus for increasing security of an electronic payment in a terminal apparatus consistent with various disclosed embodiments. The exemplary apparatus can be used to implement the disclosed methods for increasing security of an electronic payment in a terminal apparatus.

As shown in FIG. 5, the exemplary apparatus 50 can include a monitoring module 51, a keyword checking module 52, and/or a first processing module 53.

The monitoring module 51 is configured to monitor whether an application program used for an electronic payment starts running in a terminal apparatus.

The keyword checking module 52 is configured, when the monitoring module 51 has monitored the application program used for the electronic payment starts running, to check whether another currently-running program in the terminal apparatus has a keyword existed in a pre-set security-threat program listing.

The first processing module 53 is configured to close the another currently-running program having the keyword existed in the security-threat program listing.

Figure 6:
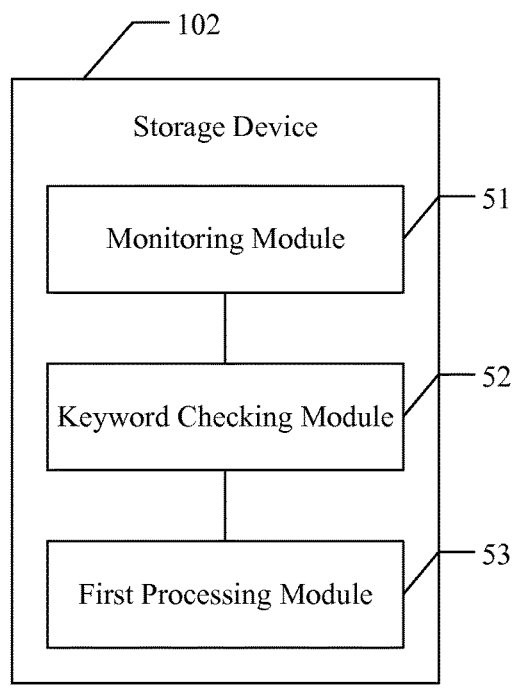
FIG. 6 depicts an exemplary storage device consistent with various disclosed embodiments.

Each of the disclosed modules can be in a form of hardware and/or software. For example, the modules may be implemented by software coding. In this case, the modules described herein may be stored in the storage device 102 as shown in FIG. 6. In various embodiments, these modules can be realized by hardware such as integrated circuit (IC) chips.

The modules included in exemplary apparatus 50 for increasing security of an electronic payment in a terminal apparatus can function to perform the methods described in FIGS. 1-4.

By using the disclosed apparatus for increasing security of electronic payments, other currently-running program having the keyword existed in the pre-set security-threat program listing can be closed, when the application program for electronic payment is currently in operation. A security operating/running environment can therefore be provided for electronic payments. The security of electronic payments can be effectively improved.

Figure 7:
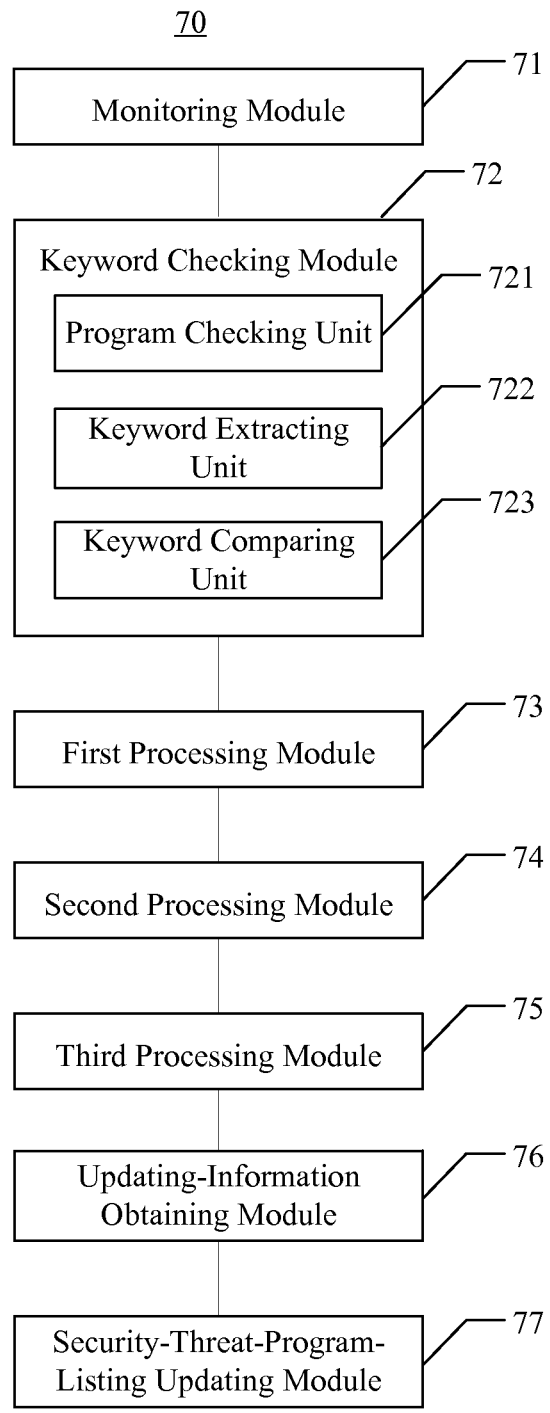
FIG. 7 depicts an exemplary apparatus for increasing security of an electronic payment in a terminal apparatus consistent with various disclosed embodiments.

FIG. 7 depicts an exemplary apparatus for increasing security of an electronic payment in a terminal apparatus consistent with various disclosed embodiments. In one embodiment, the exemplary apparatus of FIG. 7 can be used to implement, e.g., the method depicted in FIG. 2.

As shown in FIG. 7, the exemplary apparatus 70 can include a monitoring module 71, a keyword checking module 72, a first processing module 73, a second processing module 74, a third processing module 75, an updating-information obtaining module 76, and/or a security-threat-program-listing updating module 77.

The monitoring module 71 is configured to monitor whether an application program used for an electronic payment starts running in a terminal apparatus.

The keyword checking module 72 is configured to check whether another currently-running program in the terminal apparatus has a keyword existed in a pre-set security-threat program listing, when the monitoring module 71 monitors the application program used for the electronic payment starts running.

The keyword checking module 72 includes, a program checking unit 721, a keyword extracting unit 722, and/or a keyword comparing unit 723. The program checking unit 721 is configured to regularly check another currently running program in the terminal apparatus during the running period of the application program used for electric payment.

The keyword extracting unit 722 is configured to extract the keyword of the another running program. The keyword comparing unit 723 is configured to compare the keyword extracted by the keyword extracting unit 722 with the pre-set security-threat program listing.

The first processing module 73 is configured to close the another currently-running program having the keyword existed in the security-threat program listing.

The second processing module 74 is configured to unload the another currently-running program having the keyword existed in the security-threat program listing.

The third processing module 75 is configured to display a prompt message to prompt the user to select whether to unload the another currently-running program, and to respond to an unloading selection operation of the user to unload the another currently-running program.

The updating-information obtaining module 76 is configured to regularly obtain updating information of the security-threat program listing from a server, according to a pre-set updating regulation.

The security-threat-program-listing updating module 77 is configured to update the security-threat program listing, according to the updating information obtained by the updating-information obtaining module.

The modules included in exemplary apparatus 70 for increasing security of an electronic payment in a terminal apparatus can function to perform the methods described in FIGS. 1-4.

By using the disclosed apparatus for increasing security of electronic payments, other currently-running program having the keyword existed in the pre-set security-threat program listing can be closed, when the application program for electronic payment is currently in operation. A security operating/running environment can therefore be provided for electronic payments. The security of electronic payments can be effectively improved.

It should be noted that, in the present disclosure each embodiment is progressively described, i.e., each embodiment is described and focused on difference between embodiments. Similar and/or the same portions between various embodiments can be referred to with each other. In addition, exemplary apparatus is described with respect to corresponding methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a non-transitory computer-readable storage medium including, e.g., ROM/RAM, magnetic disk, optical disk, etc. The software products can include suitable commands to enable a terminal apparatus (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and apparatus for increasing security of an electronic payment are provided. By monitoring that an application program used for the electronic payment starts running in a terminal apparatus, whether another currently-running program in the terminal apparatus has a keyword existed in a pre-set security-threat program listing is checked. The another currently-running program having the keyword existed in the pre-set security-threat program listing is closed. An exemplary apparatus can include a monitoring module, a keyword checking module, and/or a first processing module.

By using the disclosed methods and apparatus for increasing security of electronic payments, other currently-running program(s) having the keyword existed in the pre-set security-threat program listing can be closed, when the application program for electronic payment is currently in operation. A security operating/running environment can therefore be provided for electronic payments. The security of electronic payments can be effectively improved.

What is claimed is:

1. A method for increasing security of an electronic payment at a terminal apparatus, comprising:
    monitoring whether an application program used for the electronic payment starts running in the terminal apparatus, wherein the terminal apparatus comprises one or more processors;
    when the application program used for the electronic payment is monitored starting running, checking whether another currently-running program in the terminal apparatus has a keyword existed in a pre-set security-threat program listing; and
    terminating the another currently-running program having the keyword existed in the pre-set security-threat program listing;
    wherein checking whether the another currently-running program in the terminal apparatus has the keyword existed in the pre-set security-threat program listing comprises: during a running period of the application program used for the electronic payment, checking the another currently-running program in the terminal apparatus; extracting the keyword of the another currently-running program; and comparing the extracted keyword with the pre-set security-threat program listing,
    wherein the pre-set security-threat program listing comprises a system process, a third party process, a plug-in, or a combination thereof, which, when running, causes a security threat to the electronic payment, and wherein the plug-in comprises a screen capture plug-in, a recording plug-in, or a combination thereof.

2. The method according to claim 1, wherein, after terminating the another currently-running program having the keyword existed in the pre-set security-threat program listing, the method further comprises:
    unloading the another currently-running program having the keyword existed in the pre-set security-threat program listing.

3. The method according to claim 1, wherein after terminating the another currently-running program having the keyword existed in the pre-set security-threat program listing, the method further comprises:
    displaying a prompt message to a user to prompt the user to select whether to unload the another currently-running program from the terminal apparatus; and
    in response to an unloading selection operation of the user, unloading the another currently-running program.

4. The method according to claim 1, further comprising:
    regularly obtaining updating information of the pre-set security-threat program listing from a server, according to a pre-set updating regulation; and updating the pre-set security-threat program listing, according to the updating information.

5. The method according to claim 4, wherein the pre-set updating regulation comprises an updating cycle such that the terminal apparatus sends a request for the updating information to obtain the pre-set security-threat program listing by an interval of a pre-set duration to the server; and according to response information returned from the server, the terminal apparatus downloads the updating information of the pre-set security-threat program listing.

6. The method according to claim 4, wherein the pre-set updating regulation comprises an updating cycle such that the terminal apparatus sends a request for the updating information to obtain the pre-set security-threat program listing to the server, when a network interface is monitored open; and according to response information returned from the server, the terminal apparatus downloads the updating information of the pre-set security-threat program listing.

7. The method according to claim 1, wherein the another currently-running program comprises a system process, a third party process, an application program plug-in, or a combination thereof, and wherein the application program plug-in comprises a screen capture plug-in, an inputting method plug-in, or a combination thereof.

8. The method according to claim 1, wherein the keyword existed in the pre-set security-threat program listing comprises at least a part of a name of a program in the pre-set security-threat program listing, wherein the name of the program comprises a name in one or more languages.

9. The method according to claim 8, wherein the name of the program comprises a Chinese character.

10. An apparatus for increasing security of an electronic payment, comprising:
    one or more processors; and
    a non-transitory computer-readable storage medium having instructions stored thereon, the instructions executed by the one or more processors and comprising:
    a monitoring module, configured to monitor whether an application program used for the electronic payment starts running;
    a keyword checking module, configured to check whether another currently-running program in the terminal apparatus has a keyword existed in a pre-set security-threat program listing, when the application program used for the electronic payment is monitored starting running; and
    a first processing module, configured to terminate the another currently-running program having the keyword existed in the security-threat program listing;
    wherein the keyword checking module comprises: a program checking unit, configured to check the another currently-running program in the terminal apparatus, during a running period of the application program used for the electronic payment; a keyword extracting unit, configured to extract the keyword of the another currently-running program; and a keyword comparing unit, configured to compare the extracted keyword with the pre-set security-threat program listing,
    wherein the pre-set security-threat program listing comprises a system process, a third party process, a plug-in, or a combination thereof, which, when running, causes a security threat to the electronic payment, and wherein the plug-in comprises a screen capture plug-in, a recording plug-in, or a combination thereof.

11. The apparatus according to claim 10, further comprising:
    a second processing module, configured to unload the another currently-running program having the keyword existed in the security-threat program listing.

12. The apparatus according to claim 10, further comprising:

a third processing module, configured to display a prompt message to prompt the user to select whether to unload the another currently-running program, and to respond to an unloading selection operation of the user to unload the another currently-running program.

13. The apparatus according to claim 10, further comprising:
an updating-information obtaining module, configured to regularly obtain updating information of the security-threat program listing from a server, according to a pre-set updating regulation; and
a security-threat-program-listing updating module, configured to update the security-threat program listing, according to the updating information obtained by the updating-information obtaining module.

14. The apparatus according to claim 13, further comprising a request sending module and an updating-information downloading module, wherein the pre-set updating regulation comprises an updating cycle such that the request sending module is configured to send a request for the updating information to obtain the pre-set security-threat program listing by an interval of a pre-set duration to the server; and according to response information returned from the server, the updating-information downloading module is configured to download the updating information of the pre-set security-threat program listing.

15. The apparatus according to claim 13, further comprising a request sending module and an updating-information downloading module, wherein the pre-set updating regulation comprises an updating cycle such that the request sending module is configured to send a request for the updating information to obtain the pre-set security-threat program listing to the server, when a network interface is monitored open; and according to response information returned from the server, the updating-information downloading module is configured to download the updating information of the pre-set security-threat program listing.

16. The apparatus according to claim 10, wherein the another currently-running program comprises a system process, a third party process, an application program plug-in, or a combination thereof, and wherein the application program plug-in comprises a screen capture plug-in, an inputting method plug-in, or a combination thereof.

17. The apparatus according to claim 10, wherein the keyword existed in the pre-set security-threat program listing comprises at least a part of a name of a program in the pre-set security-threat program listing, wherein the name of the program comprises a name in one or more languages.

18. The apparatus according to claim 17, wherein the name of the program comprises a Chinese character.

* * * * *